(12) United States Patent
Zhang et al.

(10) Patent No.: US 7,529,735 B2
(45) Date of Patent: May 5, 2009

(54) METHOD AND SYSTEM FOR MINING INFORMATION BASED ON RELATIONSHIPS

(75) Inventors: Benyu Zhang, Beijing (CN); Wei-Ying Ma, Beijing (CN); Gu Xu, Beijing (CN); Hongbin Gao, Beijing (CN); Zheng Chen, Beijing (CN); Randy Hinrichs, Sammamish, WA (US); Hua-Jun Zeng, Beijing (CN)

(73) Assignee: Microsoft Corporation, Redmond, WA (US)

( * ) Notice: Subject to any disclaimer, the term of this patent is extended or adjusted under 35 U.S.C. 154(b) by 362 days.

(21) Appl. No.: 11/057,100

(22) Filed: Feb. 11, 2005

(65) Prior Publication Data

US 2006/0184481 A1      Aug. 17, 2006

(51) Int. Cl.
*G06F 7/00* (2006.01)
*G06F 17/30* (2006.01)
*G06F 17/00* (2006.01)
*G06N 5/02* (2006.01)

(52) U.S. Cl. .................. 707/3; 707/4; 707/5; 706/48

(58) Field of Classification Search .............. None
See application file for complete search history.

(56) References Cited

U.S. PATENT DOCUMENTS

| 6,381,594 | B1 * | 4/2002 | Eichstaedt et al. | 707/3 |
| 7,152,065 | B2 * | 12/2006 | Behrens et al. | 707/5 |
| 2006/0047649 | A1 * | 3/2006 | Liang | 707/4 |
| 2006/0106847 | A1 * | 5/2006 | Eckardt et al. | 707/101 |
| 2006/0112111 | A1 * | 5/2006 | Tseng et al. | 707/100 |
| 2006/0143068 | A1 * | 6/2006 | Calabria | 705/10 |
| 2006/0271859 | A1 * | 11/2006 | Gorzela | 715/738 |

OTHER PUBLICATIONS

Google, Google Scholar (Beta), About Google Scholar—Frequently Asked Questions, Copyright 2004 Google (4 pages), Accessed Jan. 7, 2005 http://scholar.google.com/scholar/about.html.
Google, Google Advanced Scholar Search, Copyright 2005, Google (1 page), Accessed Jan. 7, 2005 http://scholar.google.com/advanced_scholar_search?q=author:Maurice+author:Pirio&hl=en&ir=.
Google, Google Scholar Beta, Copyright 2005 (1 page), Accessed Jan. 7, 2005 http://scholar.google.com/.
Xi, Wensi et al., "Link Fusion: A Unified Link Analysis Framework for Multi-Type Interrelated Data Objects," WWW 2004, ACM May 17-22, 2004.
Wang, Jidong et al., "ReCoM: Reinforcement Clustering of Multi-Type Interrelated Data Objects," ACM, Copyright 2000.

* cited by examiner

*Primary Examiner*—Vincent F Boccio
*Assistant Examiner*—Harold A Hotelling
(74) *Attorney, Agent, or Firm*—Perkins Coie LLP

(57) ABSTRACT

A method and system for identifying information about people is provided. The information system identifies groups of people that have relationships based on their relationships to documents or more generally to objects. The information system initially is provided with an indication of which people have which relationships to which documents. The information system then identifies clusters of people based on having a relationship to the same objects. The information system may also identify clusters of related objects associated with a cluster of people. When a user wants to identify information about a person, the user can provide the name of that person to the information system. The information system then can retrieve and display the names of the other people who are in the same cluster as the person.

20 Claims, 13 Drawing Sheets

FIG. 1B image-based rendering

| Group No. | Topics | Persons |
|---|---|---|
| 1 | rendering methods, eigen-texture method, model-based methods ... | K. Ikeuchi; K. Nishino |
| 2 | image-based rendering, field rendering, images captured ... | Heungyeung Shum; R. Szeliski |
| 3 | reference views, model, set ... | T. Pajdla; T. Werner |
| 4 | -d geometry, image data ... | P. Eisert; M. Magnor |
| 5 | image correction, specular reflections, image-based rendering ... | T. Shakunaga; Y. Mukaigawa |
| 6 | images acquired, image sensor, focused images ... | K. Aizawa; T. Hamamoto |
| 7 | image-based rendering, light sources, image-based modeling ... | P. N. Belhumeur; M. L. Koudelka |
| 8 | video images, image data, generalized imaging ... | M. Bosse; Chusong Chen |
| 9 | temporal behavior, dynamic textures ... | G. Doretto; S. Soatto |
| 10 | single image, varying illumination, input image ... | T. Riklin-raviv; A. Shashua |

METHOD AND SYSTEM FOR MINING INFORMATION BASED ON RELATIONSHIPS

TECHNICAL FIELD

The described technology relates generally to identifying relationships between people and particularly to using the relationships to enhance researching for information about people.

BACKGROUND

Many search engine services, such as Google and Overture, provide for searching for information that is accessible via the Internet. These search engine services allow users to search for display pages, such as web pages, that may be of interest to users. After a user submits a search request (also referred to as a "query") that includes search terms, the search engine service identifies web pages that may be related to those search terms. To quickly identify related web pages, a search engine service may maintain a mapping of keywords to web pages. The search engine service may generate this mapping by "crawling" the web (i.e., the World Wide Web) to extract the keywords of each web page. To crawl the web, a search engine service may use a list of root web pages and identify all web pages that are accessible through those root web pages. The keywords of any particular web page can be extracted using various well-known information retrieval techniques, such as identifying the words of a headline, the words supplied in the metadata of the web page, the words that are highlighted, and so on. The search engine service may calculate a relevance score that indicates how relevant each web page is to the search request based on the closeness of each match, web page popularity (e.g., Google's PageRank), and so on. The search engine service then displays to the user the links to those web pages in an order that is based on their relevance. Search engines may more generally provide searching for information in any collection of documents. For example, the collections of documents could include all U.S. patents, all federal court opinions, all archived documents of a company, and so on.

In many instances, when a user searches using a search engine, the user is not interested in the fact that certain documents happen to match the query; rather, the user is interested in information about the people who are related to the retrieved documents. For example, the user may be interested in determining the most prominent or important authors in a certain field, such as biotechnology or computer science. To make that determination, the user may submit a query using a description of that field. When the results are provided to the user, the user can then peruse the documents and try to assess which authors seem to be prominent in that field. As another example, a user may be interested in determining which authors tend to collaborate with a given author. To determine the authors, the user may submit a query using the given author's name. When the results are provided to the user, the user can then peruse the documents and try to assess which authors co-authored articles with the given author. A difficulty with the use of a general search engine for identifying information about people is that it can be very time-consuming and difficult to manually identify the needed information from the documents reported as the search results and how they relate to each other in meaningful ways. Textual results are useful, but numerical summaries of the strength of the connection between results is equally important.

Specialized search engines have been developed to search for information about people. These specialized search engines, however, are based on central databases that are maintained manually. A difficulty with specialized search engines is that they have low coverage, low update rate, and limited information and are rarely peer reviewed which increases the value of the information. The coverage is low in the sense that only a very small portion of people are represented in the databases. The update rate is low because the databases are maintained manually and it would be too costly to update them frequently. The information is limited because the databases only contain basic information, such as phone numbers and home addresses, and interpersonal relationships, such as those based on co-authorship, are not represented in the database.

It would be desirable to have a technique that would automatically derive information about people who have relationships.

SUMMARY

A method and system for identifying information about people is provided. The information system identifies groups of people that have relationships based on their relationships to documents or more generally to objects. The information system initially is provided with an indication of which people have which relationships to which documents. The information system then identifies clusters of people based on having a relationship to the same objects. The information system may also identify clusters of related objects associated with a cluster of people. When a user wants to identify information about a person, the user can provide the name of that person to the information system. The information system then can retrieve and display the names of the other people who are in the same cluster as the person.

BRIEF DESCRIPTION OF THE DRAWINGS

FIG. 1B is a diagram that illustrates a display page for searching for topic information in one embodiment.

DETAILED DESCRIPTION

Figure 1A:
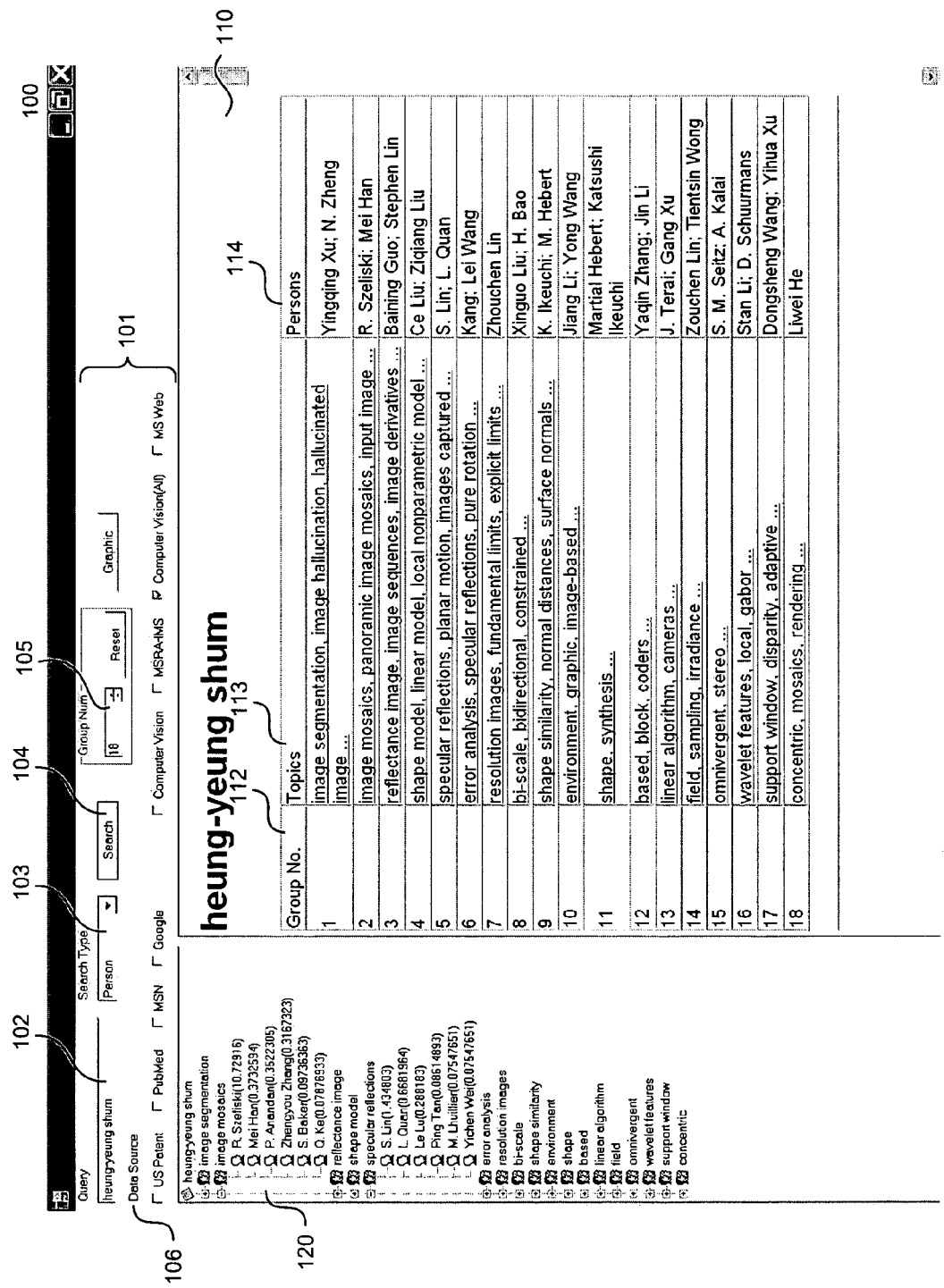
FIG. 1A is a diagram that illustrates a display page for searching for author information in one embodiment.

A method and system for identifying information about people is provided. In one embodiment, the information system identifies groups of people that have relationships based on their relationships to documents or more generally to objects, especially in qualified databases that are maintained by context and provide peer relationships between the objects. The information system initially is provided with an indication of which people have which relationships to which documents, based on qualified taxonomies. For example, if a document is a journal article, then the relationship of the people to the journal article may be that of author. As another example, if the document is a patent, then the relationship of the people to the patent may be that of inventor. As yet another example, if the object is a government grant, then the relationship of the people to the grant may be grantee. Alternatively, the information system may use various well-known techniques to determine the relationship between a person and a document. For example, the information system may analyze the text of a web page to identify names of people. The information system identifies clusters of people based on having a relationship to the same document. For example, if the relationship is author, the information system identifies clusters of authors who tend to be co-authors. The clustering of co-authors in this way identifies a group of authors who tend to collaborate among themselves. The information system may also identify clusters of related documents associated with a cluster of people. Documents may be related when they pertain to the same topic. For example, if 10 authors are grouped in an author cluster and they authored a total of 100 documents, then there may be a total of five different topics to which the documents are directed. In such a case, the information system would identify five clusters of documents for the author cluster. When a user wants to identify information about a person, the user can provide the name of that person to the information system or any number of clustered terms that are relevant to people in any given category, especially when taxonomies are defined. The information system then can retrieve and display the names of the other people who are in the same cluster as the person. The information system may also retrieve and display the various topics associated with the cluster that the person is in. In this way, the user is provided with the names of the people who are "related" to the person and topics of documents within the group of related people.

In one embodiment, the information system identifies clusters of authors based on co-author relationships. The information system initializes a publication vector for each author that contains an element for each publication that indicates whether the author authored that publication. For example, if there are five publications, then each publication vector will have five elements. If author number 1 authored publications 1, 2, 3, and 5, then the publication vector for author number 1 would be (1, 1, 1, 0, 1). The information system identifies clusters of authors based on the distance between the publication vectors. The distance indicates the similarity between any two authors. For example, if author 2 had the publication vector (1, 1, 1, 1, 1), then author 1 and author 2 would have publication vectors that are very similar. In one embodiment, the information system calculates distance between co-author vectors according to the following equation:

$$\mathrm{Dist}(A,B) = 1 - \mathrm{inner}(A,B)/\min(|A|^2, |B|^2) \tag{1}$$

where inner( ) is the dot or inner product and |.| is the norm. Using this equation, the distance between author 1 and author 2 would be 0, whereas the distance between author 1 and author 3, assuming author 3 has a publication vector of (0, 0, 1, 1, 0), would be 0.5, and author 1 is more similar to author 2 than to author 3, and author 1 and author 2 would more likely be clustered together than would author 1 and author 3. (The distance between an author and themselves is 0.) One skilled in the art will appreciate that various distance metrics may be used to evaluate the relatedness or similarity between authors. One skilled in the art will also appreciate that various well-known clustering techniques may be used to identify clusters of authors. In one embodiment, the information system uses a pairwise clustering technique in which each author is initially in their own cluster. The clustering technique then identifies the pair of clusters that are most similar and combines them into a single cluster. The similarity between clusters with multiple authors may be calculated as the average of the similarities between each pair of authors in one cluster and in the other cluster. The clustering technique may stop when the number of clusters has been reduced to a target number of clusters.

In one embodiment, the information system calculates the importance of authors within a cluster. The information system assumes that the importance of an author is related to the importance of the documents by the author and that the importance of a document is related to the importance of its authors. Thus, the information system defines the importance of authors and documents recursively. Techniques for calculating importance that is recursively defined is described in U.S. patent application Ser. No. 10/846,835, entitled "Method and System for Ranking Objects Based on Intra-Type and Inter-Type Relationships" and filed on May 14, 2004, which is hereby incorporated by reference. If the citations between documents are not available or not used, the techniques can be simplified to the following equations:

$$R_{author} = W \, \mathrm{diag}(R_{paper} N^T_{paper}) \tag{2}$$

$$R_{paper} = W^T \, \mathrm{diag}(R_{author} N^T_{author}) \tag{3}$$

where $R_{author}$ is a vector of the importance (or ranking) of the authors, $R_{paper}$ is a vector of the importance (or ranking) of the papers, $W$ is an adjacency matrix mapping authors to papers, $N^T_{paper}$ is a matrix of normalization terms for the documents, and $N^T_{author}$ is a matrix of normalization terms for the authors. The normalization terms may be defined by the following equations:

$$N_{author} = I/\mathrm{sum}(W) \tag{4}$$

$$N_{paper} = I/\mathrm{sum}(W^T) \tag{5}$$

where I is a vector in which all the elements are one and sum( ) calculates the sum of each row.

In one embodiment, the information system identifies the importance of authors to a specific topic or a specific person. For given a topic, the related documents are obtained by searching with keywords. For given a person name, the related documents are the papers authored by this person. After the information system collects all the related documents, the information system identifies the importance of each author to the whole collection by solving Equations 2 and 3. The information system first clusters the authors and then assigns each document to the author clusters according to the authorships. For example, if author 1 is in author cluster 1, then all the documents authored by author 1 belong to a document cluster corresponding to the author cluster 1. Each document cluster usually relates to a topic (given a person name) or a sub-topic (given a topic), so the term "topic" may be used to refer to a corresponding document cluster. The importance of each author to certain topic is equal to the importance to the whole collection. In one embodiment, the information system may identify trends based on the importance of authors. For example, a user may want to identify authors whose importance to a certain topic increases faster than other authors over time. Such an author may be considered a "rising star" within the field of that topic. The information system may compare the year-to-year importance of the authors to a topic to identify the "rising stars."

In one embodiment, the information system identifies a description of the topic of a document cluster by extracting keywords from the documents. The information system may initially select each two-word phrase within the documents of the cluster and calculate a ranking of those phrases as being descriptive of the topic of the document cluster. In one embodiment, the information system may use a term frequency by inverse document frequency metric (i.e., TF*IDF) to calculate the importance of the phrases. The information system then selects a certain number of the highest-ranking two-word phrases for further processing. The information system attempts to extend each selected two-word phrase by adjacent words so long as the extended phrase would have a higher ranking than before the extension. For example, if extending to a three-word phrase would have a higher ranking than the unextended two-word phrase, then the information system extends the phrase to three words. If extending to a four-word phrase would not have a higher ranking than the unextended three-word phrase, then the information system does not extend the phrase to four words. In such a case, the information system would stop after the phrase was extended to three words. If the extension of a selected phrase would overlap another selected phrase, then the information system concatenates the phrases to form a single phrase. The concatenation of the phrases may be based on whether the ranking of the resulting phrase would be higher than the ranking of the individual phrases. The information system may continue extending phrases until no more phrases can be extended or until the phrases are extended to a certain length.

In one embodiment, the information system uses the author clusters and document clusters to help identify information about an author whose name is ambiguous. Many authors may have the same name or have the same abbreviated name (e.g., "J. T. Smith" for "John Thomas Smith" and "Jeffery Timothy Smith"). Thus, a name is ambiguous when it is used to identify more than one author. When a user uses a conventional search engine to search using an ambiguous name, the search results would include documents from the various authors who share that ambiguous name. It can be difficult and time-consuming for a user to identify the documents that are of interest and even more difficult to identify additional information about the author of interest when the search results are based on an ambiguous name. For example, the user may not be able to identify the correct electronic mail address of the author of interest. The information system may be used to identify more precise information about a particular author by the user using the extracted group topics. The information system identifies the documents relating to that topic and then identifies those documents that were authored by the named author. In general, there may be a low probability that the people sharing ambiguous names will be working in the same topic. Thus, the information system may extract information (e.g., electronic mail address) and present information to the user as the information of the author of interest.

FIG. 1A is a diagram that illustrates a display page for searching for author information in one embodiment. The display page 100 includes an author query area 101, a result area 110, and an alternate result area 120. The author query area includes a query input field 102, a search type drop-down box 103, a search button 104, a number of groups button 105, and data source checkboxes 106. To search for information about an author, the user enters the author name into the author query area and selects "person" in the search type drop-down box. The user may also indicate the maximum number of different topics that are to be identified for the author. The user may also indicate the sources of the documents as indicated by the checkboxes. The user then selects the search button to start the search. The information system then collects all the documents related to the input author. The information system then clusters the authors as well as the documents based on the number of groups indicated by the user. The result area contains an author name field 111 and a table with a row for each group of documents along with a group number field 112, a topics field 113, and a persons field 114. The topics field lists the phrases that are descriptive of the topic or group as determined by the phrase ranking as described above. The persons field lists the authors of the documents of the group. The persons may be the authors of the journal articles or the inventors of the patents depending on which combination of data sources is selected. The persons field may list the persons in order of importance to that topic. The alternate result area provides a different user interface for displaying the results. If the name entered by the user is ambiguous, then there may be multiple topics that list documents relating to the ambiguous name but for different authors. If the user knows a topic relating to the author of interest, then the user may select the author associated with that topic to obtain more information that is derived from the documents within that topic.

FIG. 1B is a diagram that illustrates a display page for searching for topic information in one embodiment. The display page 150 is similar to display page 100. The user has selected to search for documents relating to the topic of "image-based rendering" and to cluster the documents into 18 sub-topics. The information system collects the documents relating to that topic and then clusters the documents by sub-topic. The information system then calculates the importance of the authors of documents within each cluster.

Figure 2:
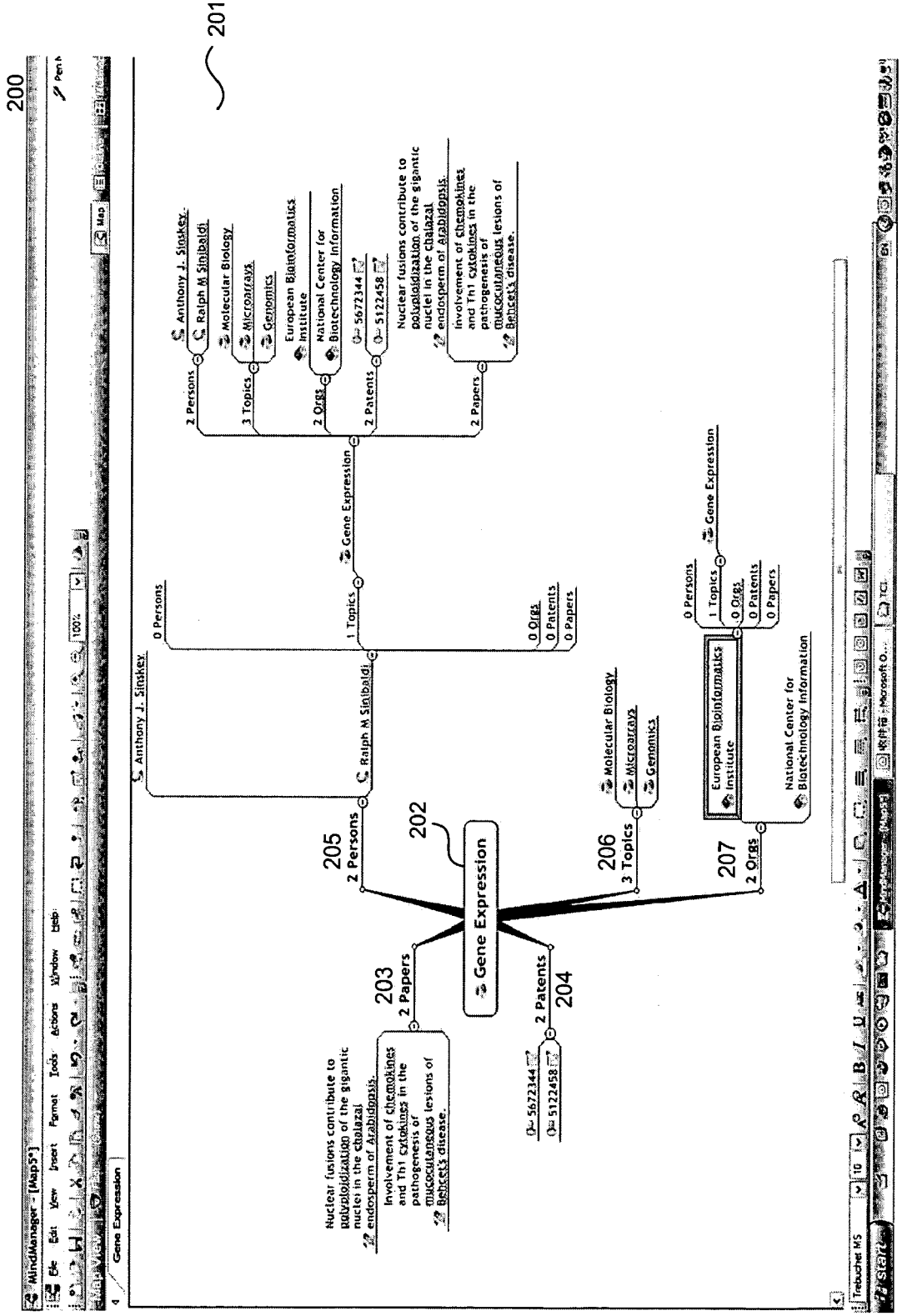
FIG. 2 is a diagram that illustrates a display page for displaying information about a subject in one embodiment.

FIG. 2 is a diagram that illustrates a display page for displaying information about a subject in one embodiment. The display page 200 includes display area 201 that is currently displaying information about a selected subject. The information system may provide a hierarchy of high-level subjects in which to initially classify documents. In this example, the subject is gene expression, which is shown in box 202. The information system displays different types of information relating to gene expression at the ends of the lines that emanate from the box. For example, information relating to papers associated with the gene expression subject is shown at the end of line 203. Similarly, information relating to patents, persons, topics, and organizations are shown at the end of lines 204-207, respectively.

Figure 3:
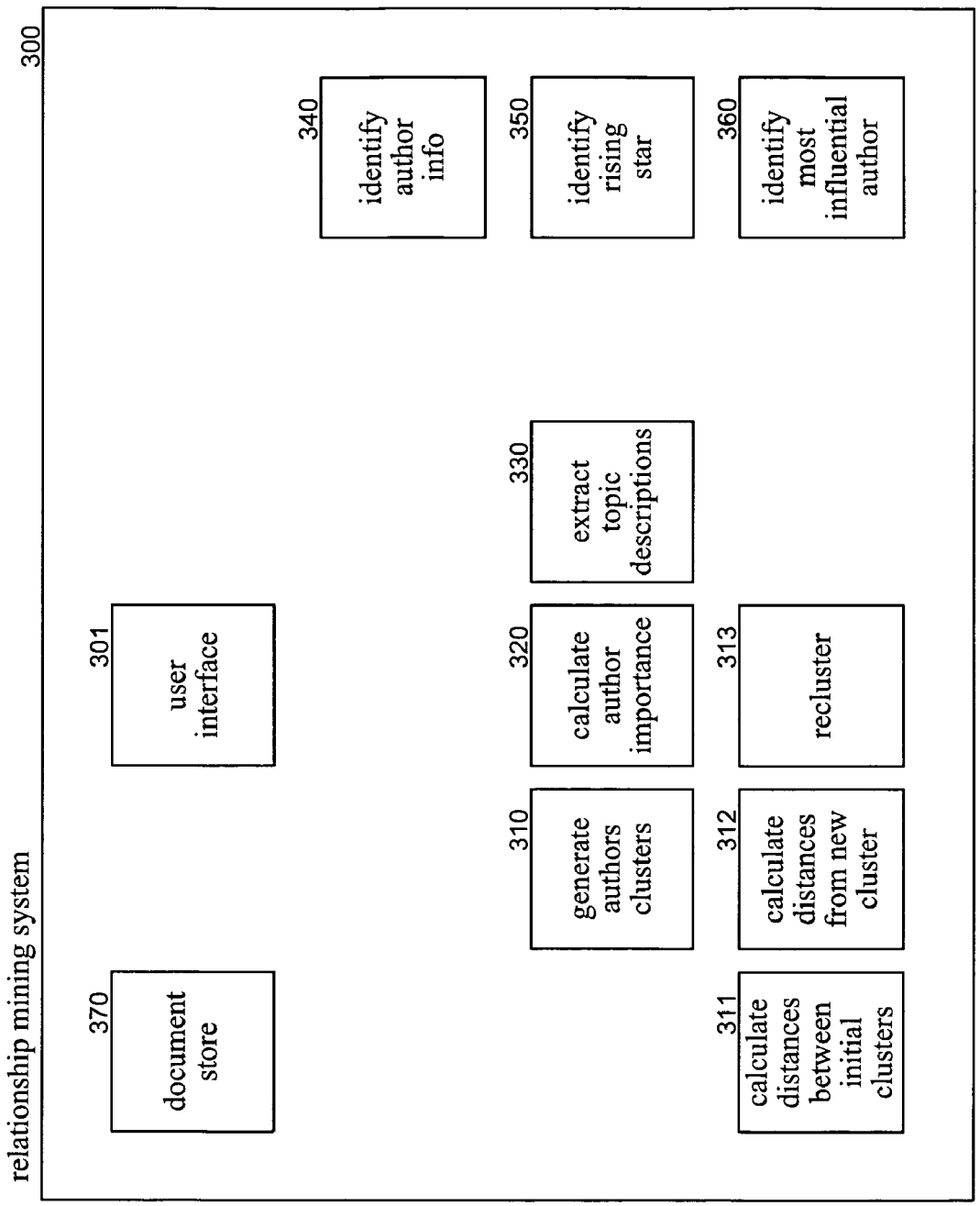
FIG. 3 is a block diagram that illustrates the components of the information system in one embodiment.

FIG. 3 is a block diagram that illustrates the components of the information system in one embodiment. The information system 300 includes a user interface 301, a generate author clusters component 310, a calculate author importance component 320, an extract topic descriptions component 330, and a document store 370 for performing the base functions of the information system. The information system may also include an identify author information component 340, an identify rising star component 350, and an identify most influential author component 360. The user interface component provides the user interface as described in FIG. 1. The generate author clusters component is provided with a set of documents and generates the author clusters within that set of documents. The generate author clusters component invokes a calculate distances between initial clusters component 311, a calculate distances from new cluster component 312, and a recluster component 313 to effect an implementation of a pairwise clustering technique. The information system may also include a generate document clusters component (not shown) to cluster related documents within an author cluster. One skilled in the art will appreciate that various well-known clustering techniques may be used to cluster the documents. The calculate author importance component calculates the importance of the authors within an author cluster or within a document cluster. The extract topic descriptions component extracts the phrases that describe the topic of a document cluster. The identify author information component is used to retrieve information about an author based on a topic and the author's name, which may be ambiguous. The identify rising star component is used to identify an author whose importance to a particular topic is increasing over time. The identify most influential author component is used to identify the most influential author to a given author. The document store contains the collection of documents or more generally objects. The information system may gather the objects from various data sources such as results of web search engines, patent databases, journal article databases, and so on.

The computing device on which the information system is implemented may include a central processing unit, memory, input devices (e.g., keyboard and pointing devices), output devices (e.g., display devices), and storage devices (e.g., disk drives). The memory and storage devices are computer-readable media that may contain instructions that implement the information system. In addition, the data structures and message structures may be stored or transmitted via a data transmission medium, such as a signal on a communications link. Various communications links may be used, such as the Internet, a local area network, a wide area network, or a point-to-point dial-up connection.

The information system may be implemented in various operating environments. Various well-known computing systems, environments, and configurations that may be suitable for use include personal computers, server computers, handheld or laptop devices, multiprocessor systems, microprocessor-based systems, programmable consumer electronics, network PCs, minicomputers, mainframe computers, distributed computing environments that include any of the above systems or devices, and the like.

The information system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
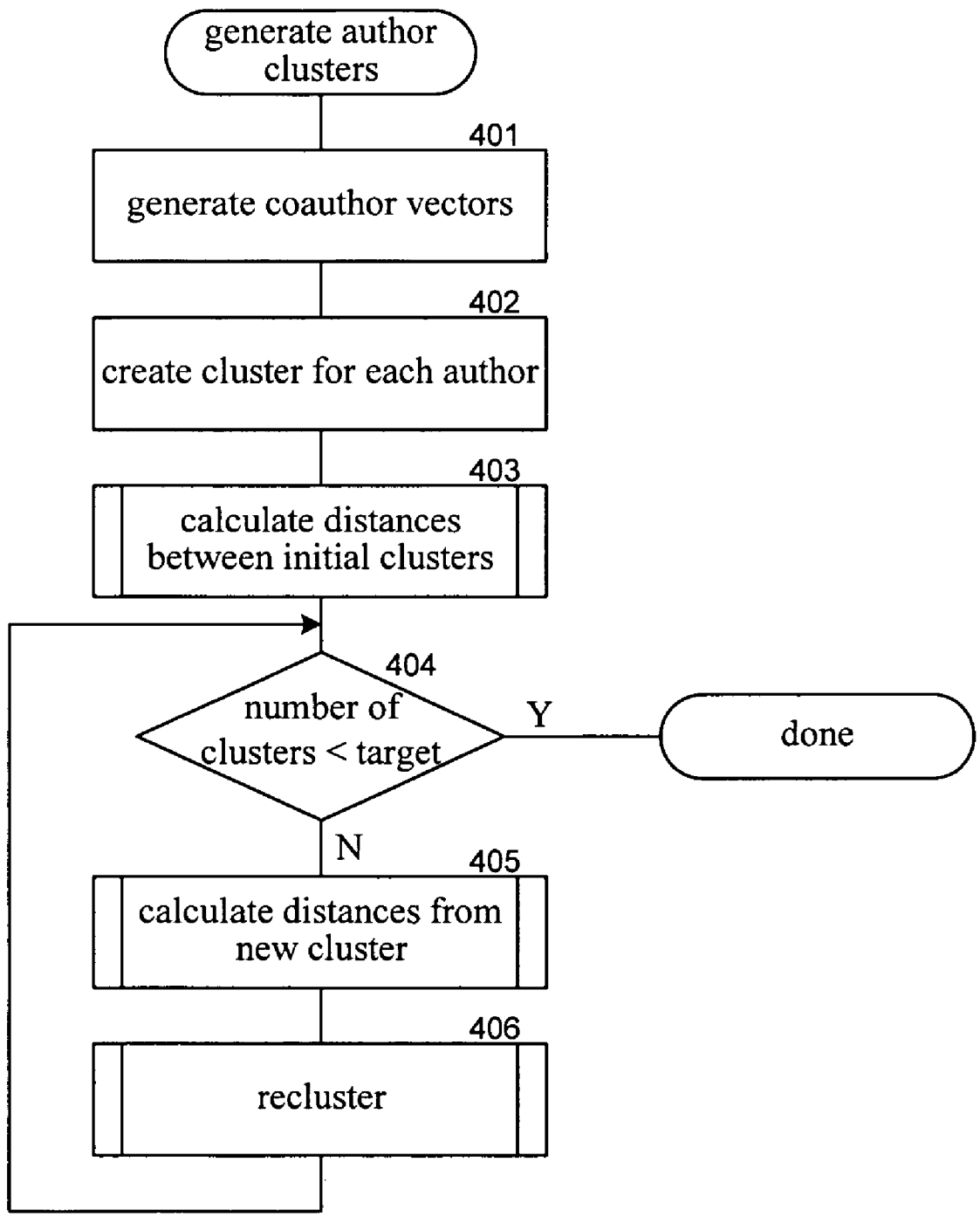
FIG. 4 is a flow diagram that illustrates the processing of the generate author clusters component in one embodiment.

FIG. 4 is a flow diagram that illustrates the processing of the generate author clusters component in one embodiment. The component is passed an indication of the authors of a collection of documents. For example, the collection may be related to the subject of gene expression. The component implements a pairwise clustering algorithm. The component first generates publication vectors and then creates a cluster for each author. The component then loops combining clusters that are most closely related until a target number of clusters remains. In block 401, the component generates the publication vectors as described above. In block 402, the component creates a cluster for each author. In block 403, the component invokes the calculate distances between initial clusters component to calculate the distances between pairs of authors. In blocks 404-406, the component loops performing a pairwise combining of the most related clusters for each iteration. In decision block 404, if the number of clusters remaining is less than the target number of clusters, then the component completes, else the component continues at block 405. In block 405, the component invokes the calculate distances from new cluster component. In block 406, the component invokes the recluster component to perform pairwise reclustering based on the new calculated distances. The component then loops to block 404 to determine whether the target number of clusters has been reached.

Figure 5:
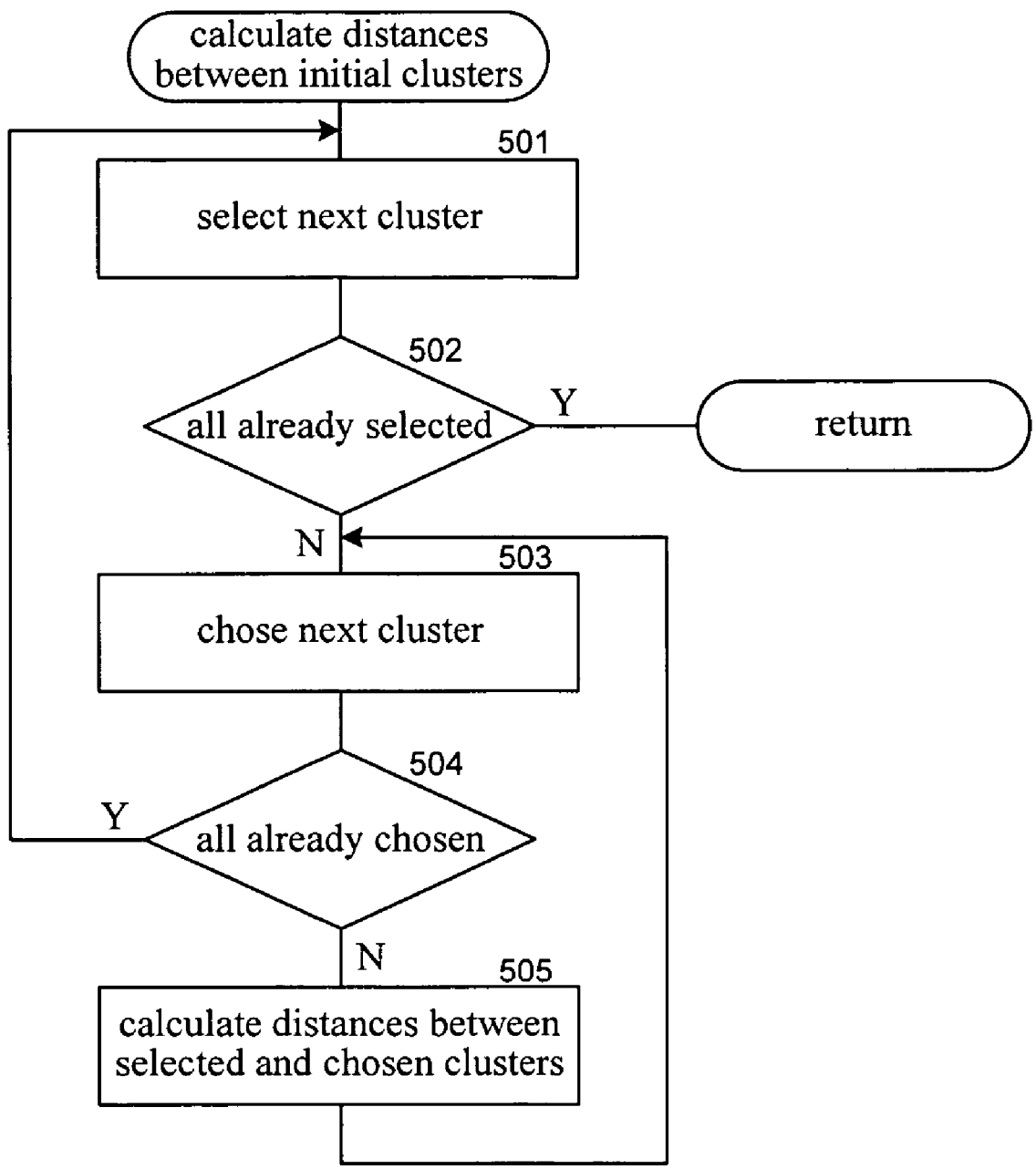
FIG. 5 is a flow diagram that illustrates the processing of the calculate distances between initial clusters component in one embodiment.

FIG. 5 is a flow diagram that illustrates the processing of the calculate distances between initial clusters component in one embodiment. The component is passed the initial clusters which each contain one author. The component loops calculating the distance or similarity between each pair of clusters or authors based on the publication vectors. One skilled in the art will appreciate that the distance between author 1 and author 2 and the distance between author 2 and author 1 are the same and that the distances between each author and themselves is 0, and as such the processing described in this flow diagram can be optimized to reduce duplicate calculations and calculations with known results. In blocks 501-505, the component loops selecting each cluster and then for each cluster choosing the other clusters and calculating the distance between the pair of clusters. In block 501, the component selects the next cluster. In decision block 502, if all the clusters have already been selected, then the component returns, else the component continues at block 503. In block 503, the component chooses the next cluster for the selected cluster. In decision block 504, if all the clusters have already been chosen for the selected cluster, then the component loops to block 501 to select the next cluster, else the component continues at block 505. In block 505, the component calculates the distance between the selected cluster and chosen cluster using Equation 1 and then loops to block 503 to choose the next cluster for the selected cluster.

Figure 6:
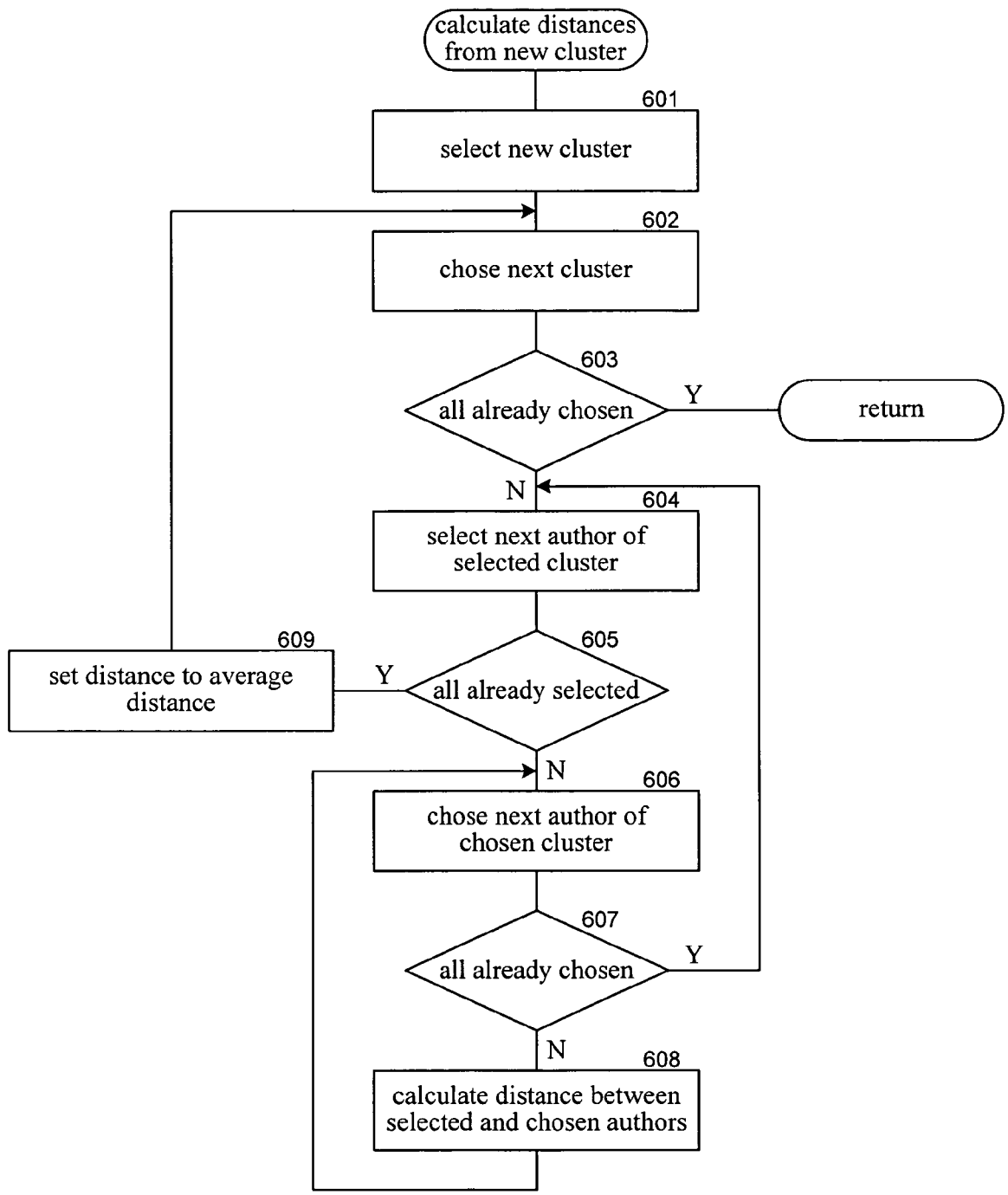
FIG. 6 is a flow diagram that illustrates the processing of the calculate distances from new cluster component in one embodiment.

FIG. 6 is a flow diagram that illustrates the processing of the calculate distances from new cluster component in one embodiment. One skilled in the art will appreciate that only the pairwise distances between the new cluster and the other clusters need to be calculated during each iteration of combining clusters. In addition, one skilled in the art will appreciate that the distance between two publication vectors does not change and may be calculated once (e.g., by the calculate distances between initial clusters component) and stored. In such a case, those distances can be used when calculating the average distance between clusters that contain multiple authors. In block 601, the component selects the new cluster. In blocks 602-609, the component loops choosing each other cluster and then calculating the distance between the selected cluster and the chosen cluster. In block 602, the component chooses the next cluster. In decision block 603, if all the clusters have already been chosen, then the component returns, else the component continues at block 604. In blocks 604-608, the component loops calculating (or retrieving) the distances between each author in the selected cluster and each author in the chosen cluster. In block 604, the component selects the next author of the selected cluster. In decision block 605, if all the authors of the selected cluster have already been selected, then the component continues at block 609, else the component continues at block 606. In block 606, the component chooses the next author of the chosen cluster. In decision block 607, if all the authors of the chosen cluster have already been selected, then the component loops to block 604 to select the next author of the selected cluster, else the component continues at block 608. In block 608, the component calculates the distance between the selected and chosen authors and then loops to block 606 to choose the next author for the chosen cluster. In block 609, the distances between the authors in the selected cluster and the chosen cluster have been calculated, and the component calculates the average distance of those distances as the distance between the selected cluster and the chosen cluster. The component then loops to block 602 to choose the next cluster.

Figure 7:
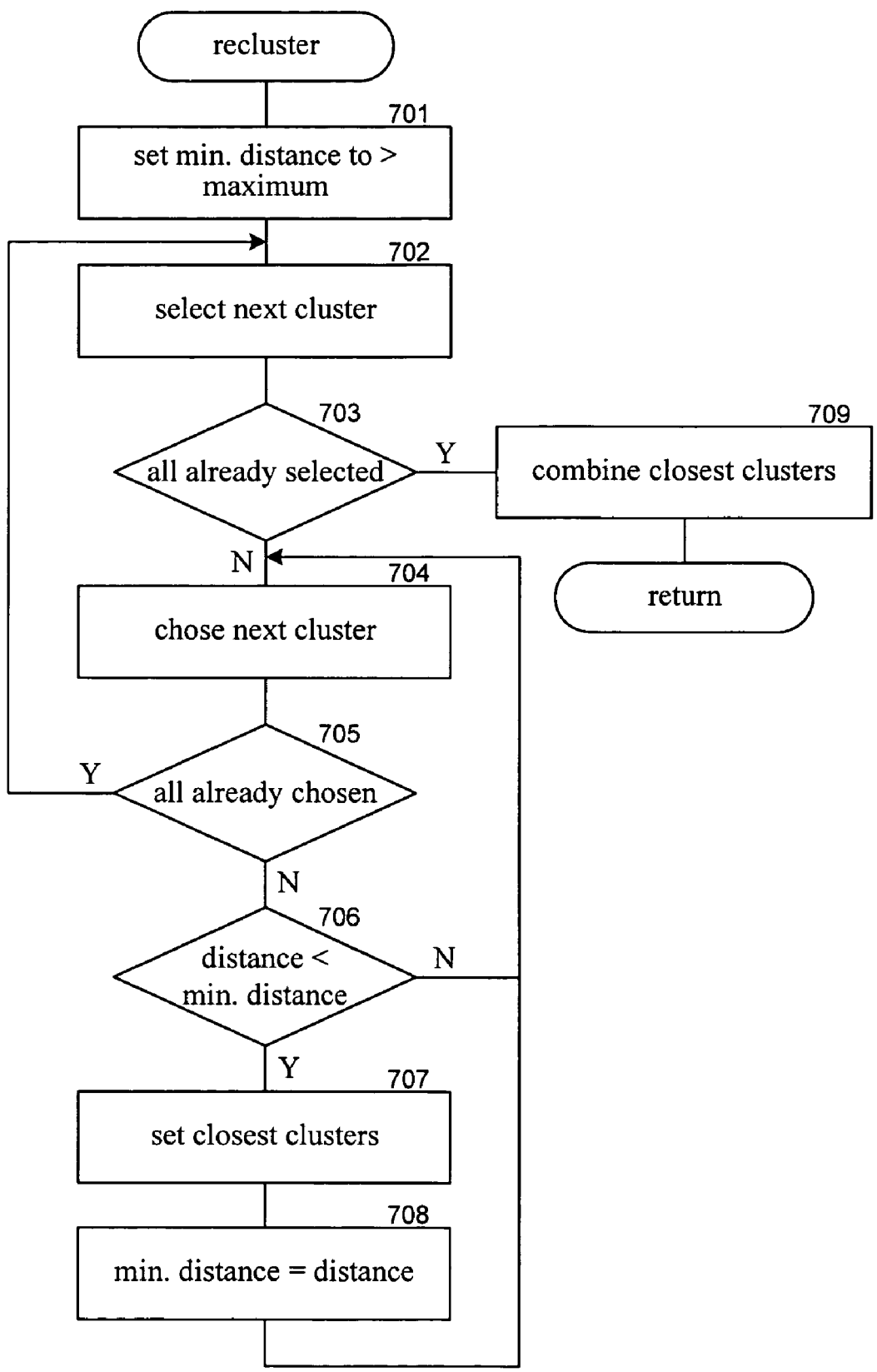
FIG. 7 is a flow diagram that illustrates the processing of the recluster component in one embodiment.

FIG. 7 is a flow diagram that illustrates the processing of the recluster component in one embodiment. The component identifies the pair of clusters with the minimum distance and then combines the authors of those clusters into a single cluster. In block 701, the component initializes the minimum distance found so far to greater than the maximum possible distance. In blocks 702-708, the component loops selecting each pair of clusters and identifying the pair with the minimum distance. In block 702, the component selects the next cluster. In decision block 703, if all the clusters have already been selected, then the component continues at block 709, else the component continues at block 704. In block 704, the component chooses the next cluster for the selected cluster. In decision block 705, if all the clusters for the selected cluster have already been chosen, then the component loops to block 702 to select the next cluster, else the component continues at block 706. In decision block 706, if the distance between the selected cluster and the chosen cluster is less than the minimum distance encountered so far, then the component continues at block 707, else the component loops to block 704 to choose the next cluster for the selected cluster. In block 707, the component records that the selected cluster and the chosen cluster have the minimum distance encountered so far. In block 708, the component sets the minimum distance to the distance between the selected cluster and the chosen cluster. The component then loops to block 704 to choose the next cluster for the selected cluster. In block 709, the component combines the clusters with the minimum distance and returns.

Figure 8:
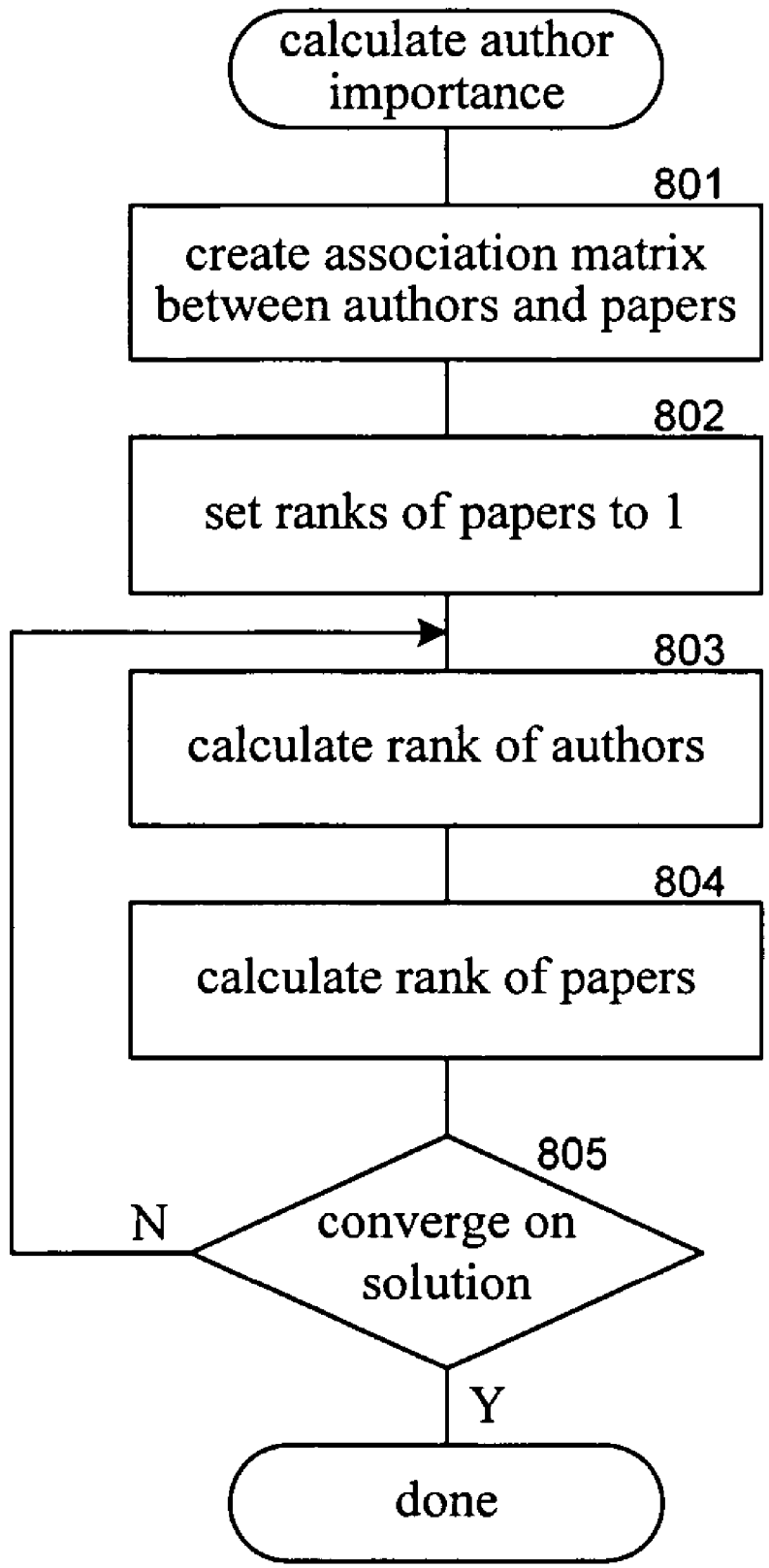
FIG. 8 is a flow diagram that illustrates the processing of the calculate author importance component in one embodiment.

FIG. 8 is a flow diagram that illustrates the processing of the calculate author importance component in one embodiment. The component calculates the importance of each author based on a set of documents. In block 801, the component creates an adjacency matrix (or association matrix) with a row for each author and a column for each document that indicates the documents by the author. In block 802, the component initializes the importance of each document to 1. In blocks 803-805, the component loops solving Equations 2 and 3. In block 803, the component calculates the importance of the authors according to Equation 2. In block 804, the component calculates the importance of the documents according to Equation 3. In decision block 805, if the calculations converge on a solution, then the component completes, else the component loops to block 803 to perform the next iteration.

Figure 9:
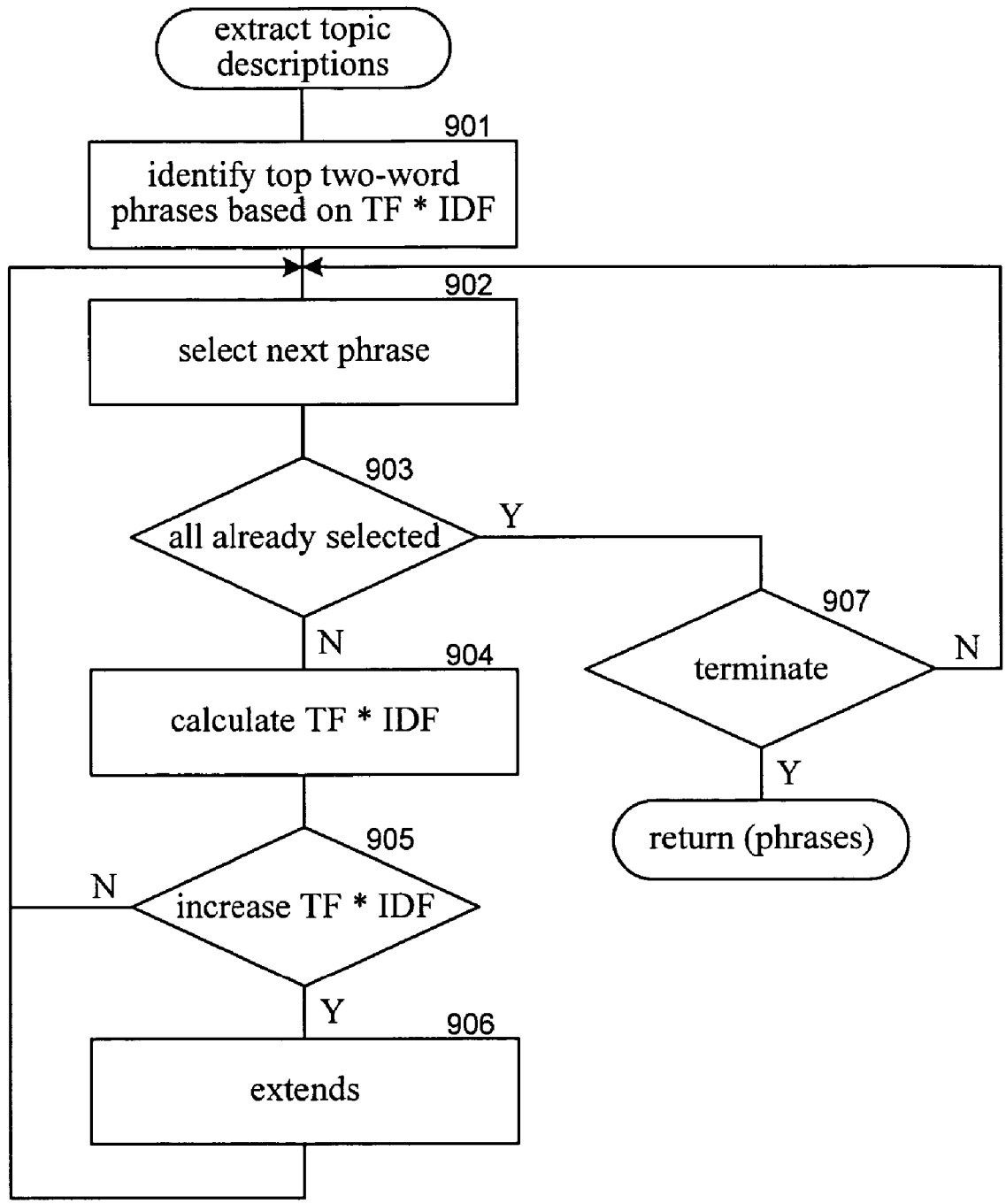
FIG. 9 is a flow diagram that illustrates the processing of the extract topic descriptions component in one embodiment.

FIG. 9 is a flow diagram that illustrates the processing of the extract topic descriptions component in one embodiment. The component is invoked after the author clusters and their documents clusters have been identified. The component applies a term frequency by inverse document frequency algorithm to rank the phrases of the documents as being descriptive of the topic of the documents. In block 901, the component identifies the highest ranking two-word phrases within the documents. For example, the component may select the 10 highest ranking two-word phrases. In blocks 902-907, the component loops extending the phrases. In block 902, the component selects the next phrase. In decision block 903, if all the phrases have already been selected, then the component continues at block 907, else the component continues at block 904. In block 904, the component calculates the importance of the selected phrase assuming that it were to be extended. In decision block 905, if the extending of the phrase will increase the ranking of the phrase, then the component continues at block 906, else the component loops to block 902 to select the next phrase. The component may also mark that phrase as having been fully extended so that it is not selected on the next iteration. In block 906, the component extends the phrase and then loops to block 902 to select the next phrase. In decision block 907, if a terminate criterion has been satisfied, then the component returns the phrases, else the component loops to block 902 to select the next phrase. The terminate criterion may indicate that the processing should complete after a certain number of iterations or when no more phrases can be extended.

Figure 10:
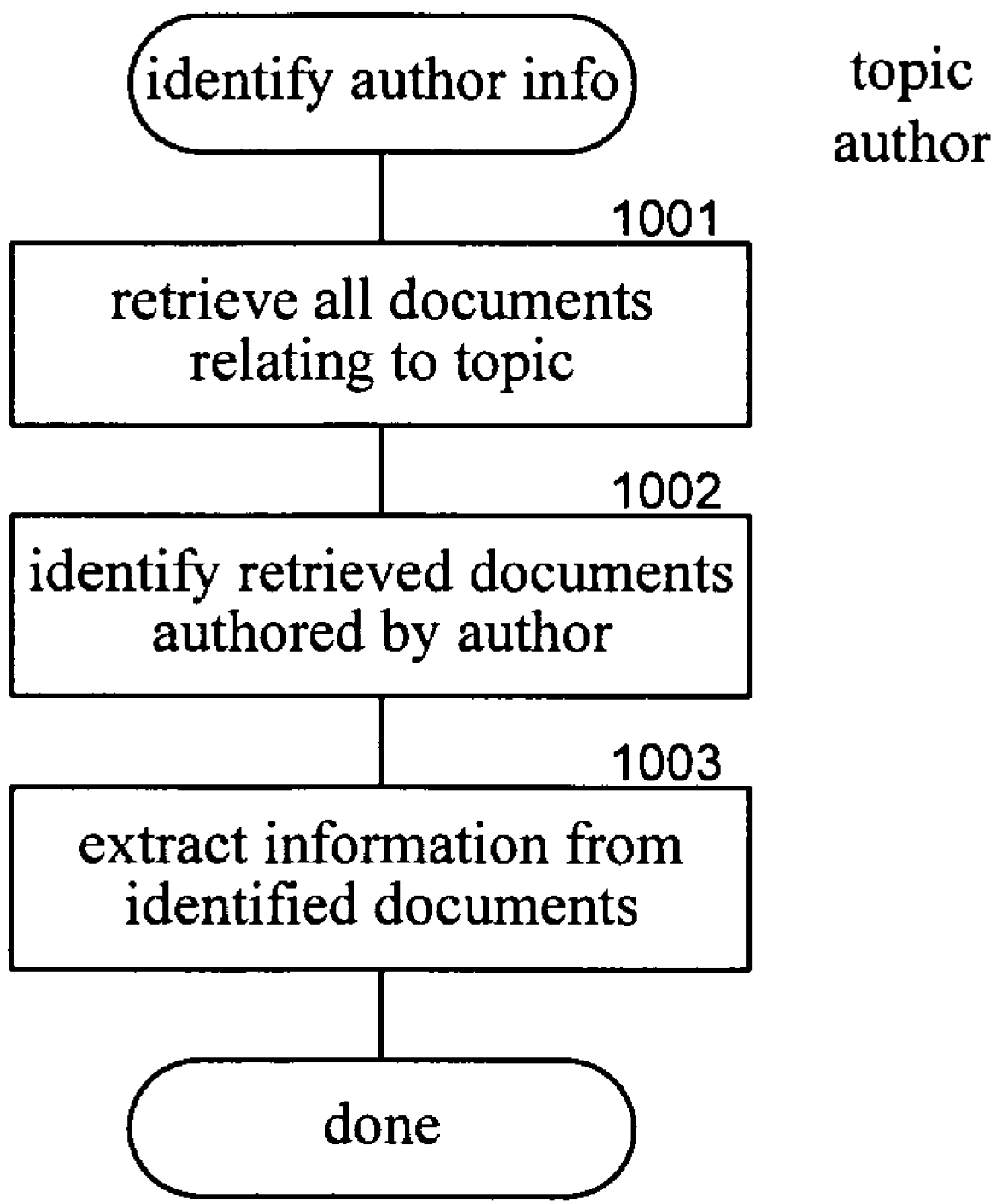
FIG. 10 is a flow diagram that illustrates the processing of the identify author information component in one embodiment.

FIG. 10 is a flow diagram that illustrates the processing of the identify author information component in one embodiment. The component is passed a topic and an author and then retrieves information from the documents within that topic authored by that author. In block 1001, the component retrieves all the documents relating to that topic. In block 1002, the component identifies the retrieved documents that are authored by that author. In block 1003, the component extracts information about the identified author from the identified documents. The component then completes.

Figure 11:
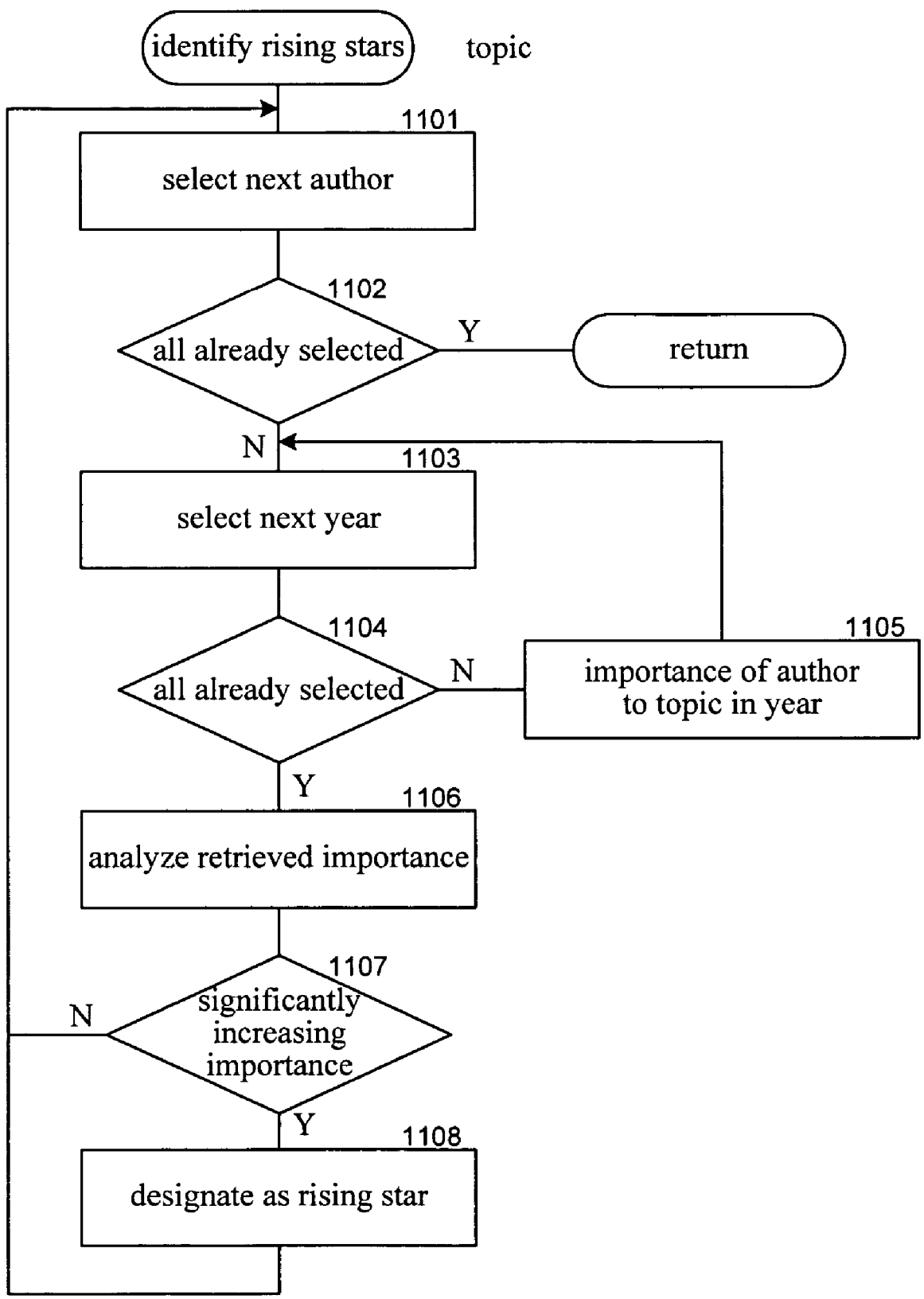
FIG. 11 is a flow diagram that illustrates the processing of the identify rising star component in one embodiment.

FIG. 11 is a flow diagram that illustrates the processing of the identify rising star component in one embodiment. The component is passed a topic and then analyzes the importance of the authors of documents within that topic to determine which authors' importance has been increasing relative to other authors over the last few years. In block 1201, the component selects the next author. In decision block 1202, if all the authors have already been selected, then the component returns, else the component continues at block 1203. In blocks 1203-1205, the component loops calculating or retrieving the importance of the selected author for various years. In block 1203, the component selects the next year. In decision block 1204, if all the years have already been selected, then the component continues at block 1206, else the component continues at block 1205. In block 1205, the component calculates the importance of the author to the topic for the documents published in the selected year and then loops to block 1203 to select the next year. In block 1206, the component analyzes the trend of the importance of the selected author for the various years. In decision block 1207, if the author's importance is increasing significantly, then the component continues at block 1208, else the component loops to block 1201 to select the next author. In block 1208, the component designates the selected author as a rising star and loops to block 1201 to select the next author.

Figure 12:
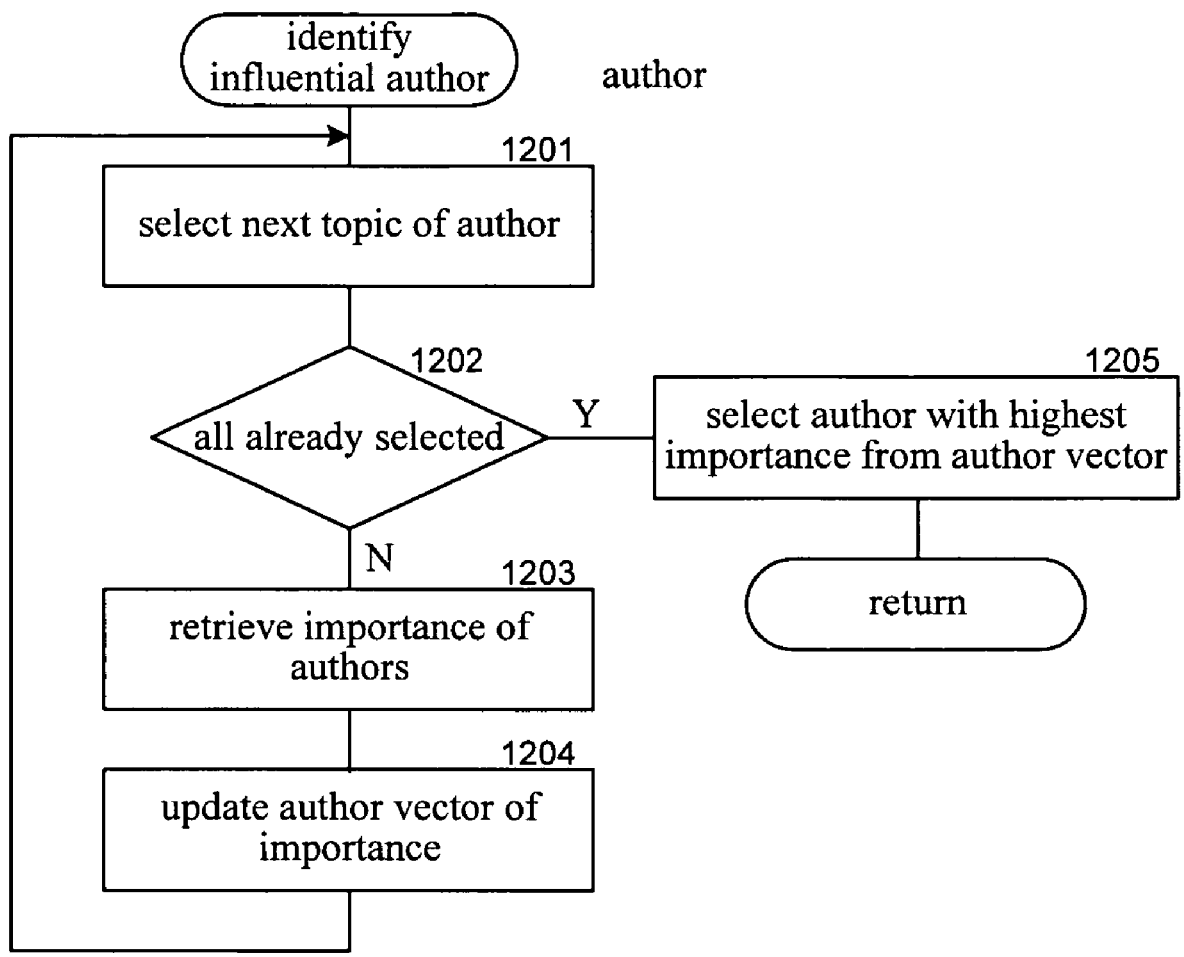
FIG. 12 is a flow diagram that illustrates the processing of the identify most influential author component in one embodiment.

FIG. 12 is a flow diagram that illustrates the processing of the identify most influential author component in one embodiment. The component is passed an indication of an author. An influential author to a given author is an important author who writes on the same topics as that of the given author. In block 1301, the component selects the next topic of the author. In decision block 1302, if all the topics have already been selected, then the component continues at block 1305, else the component continues at block 1303. In block 1303, the component retrieves the importance of the authors within the selected topic. In block 1304, the component updates an author vector of importance. The component may maintain an author vector that indicates for the passed author those authors of documents within the topics of the author. As new authors are identified from newly selected topics, the vector is extended. The importance stored in the vector may indicate the cumulative importance of that author across the selected topics. The component then loops to block 1301 to select the next topic of the passed author. In block 1305, the component selects the author with the highest importance from the author vector as the most influential author and then returns.

One skilled in the art will appreciate that although specific embodiments of the information system have been described herein for purposes of illustration, various modifications may be made without deviating from the spirit and scope of the invention. Accordingly, the invention is not limited except as by the appended claims.

We claim:

1. A computer-implemented method for a computer to identify authors that have a relationship, the method comprising:

providing an indication of authors of papers;
   identifying clusters of authors based on co-author relationships between the authors wherein authors within a same cluster have a relationship;
   storing in a memory of the computer an indication of the identified clusters of authors; and
   calculating an importance of authors within an author cluster
   wherein the importance of an author is defined recursively based on the importance of the papers authored by the author and
   wherein the importance of an author and a paper is defined as follows:

$R_{author} = W \operatorname{diag}(R_{paper} N^T_{paper})$ $R_{paper} = W^T \operatorname{diag}(R_{author} N^T_{author})$ where $R_{author}$ is a vector of the importance (or ranking) of the authors, $R_{paper}$ is a vector of the importance (or ranking) of the papers, W is an adjacency matrix mapping authors to papers, $W^T$ is a transpose of the adjacency matrix W, $N^T_{paper}$ is a matrix of normalization terms for the papers, and $N^T_{author}$ is a matrix of normalization terms for the authors.

2. The computer-implemented method of claim 1 wherein the identifying of author clusters includes:

generating a publication vector for each author, a publication vector identifying papers authored by the author; and
   clustering the authors based on distance between the publication vectors.

3. The computer-implemented method of claim 2 wherein the distance is defined as follows:

$\operatorname{Dist}(A,B) = 1 - \operatorname{inner}(A,B)/\min(|A|2, |B|2)$ where inner( ) is the dot product and |.| is the norm.

4. The computer-implemented method of claim 1 including clustering papers of authors within an author cluster into clusters of topics.

5. The computer-implemented method of claim 4 including identifying descriptions of a topic of the papers of a paper cluster.

6. The computer-implemented method of claim 5 wherein the identifying includes ranking phrases within the papers of a topic based on descriptiveness of the topic.

7. The computer-implemented method of claim 6 wherein the ranking of phrases includes:

ranking two-word phrases within the papers;
   selecting high ranking two-word phrases; and
   repeatedly extending the selected phrases based on the ranking of the extended phrases.

8. The computer-implemented method of claim 4 including identifying information relating to an author by receiving an indication of an author and a topic and extracting information about the author from papers authored by that author within that topic.

9. The computer-implemented method of claim 4 including identifying an author as a rising star within the topic of the paper cluster based on increasing importance of that author to that topic over time.

10. The computer-implemented method of claim 4 including identifying an influential author to an author based on importance of the authors within each paper cluster for which the author authored a paper.

11. A computer-readable storage medium containing instructions for controlling a computer system to provide information about authors that have a relationship, by a method comprising:

accessing indications of authors of papers to identify clusters of authors based on co-author relationships between the authors wherein authors within a same cluster have a co-author relationship;
    storing an indication of the identified clusters of authors; and
    calculating an importance of authors within an author cluster
    wherein the importance of an author is defined recursively based on the importance of the papers authored by the author and
    wherein the importance of an author and a paper is defined as follows:

$R_{author} = W \operatorname{diag}(R_{paper} N^T_{paper})$ $R_{paper} = W^T \operatorname{diag}(R_{author} N^T_{author})$ where $R_{author}$ is a vector of the importance of the authors, $R_{paper}$ is a vector of the importance of the papers, W is an adjacency matrix mapping authors to papers, $W^T$ is a transpose of the adjacency matrix W, $N^T_{paper}$ is a matrix of normalization terms for the papers, and $N^T_{author}$ is a matrix of normalization terms for the authors.

12. The computer-readable storage medium of claim 11 wherein the identifying of author clusters includes:

generating a publication vector for each author, a publication vector identifying papers authored by the author; and
    clustering the authors based on distance between the publication vectors.

13. The computer-readable storage medium of claim 12 wherein the distance is defined as follows:

$\operatorname{Dist}(A,B) = 1 - \operatorname{inner}(A,B)/\min(|A|2, |B|2)$ where inner( ) is the dot product and |.| is the norm.

14. The computer-readable storage medium of claim 11 including clustering papers of authors within an author cluster into clusters of topics.

15. The computer-readable storage medium of claim 14 including identifying descriptions of a topic of the papers of a paper cluster.

16. The computer-readable storage medium of claim 15 wherein the identifying includes ranking phrases within the papers of a topic based on descriptiveness of the topic.

17. The computer-readable storage medium of claim 16 wherein the ranking of phrases includes:
   ranking two-word phrases within the papers;
   selecting high ranking two-word phrases; and
   repeatedly extending the selected phrases based on the ranking of the extended phrases.

18. The computer-readable storage medium of claim 14 including identifying information relating to an author by receiving an indication of an author and a topic and extracting information about the author from papers authored by that author within that topic.

19. The computer-readable storage medium of claim 14 including identifying an author as a rising star within the topic of the paper cluster based on increasing importance of that author to that topic over time.

20. The computer-readable storage medium of claim 14 including identifying an influential author to an author based on importance of the authors within each paper cluster for which the author authored a paper.

* * * * *